United States Patent [19]

Lapeyre

[11] 3,984,985

[45] Oct. 12, 1976

[54] SOLAR ENGINE

[75] Inventor: James M. Lapeyre, New Orleans, La.

[73] Assignee: The Laitram Corporation, New Orleans, La.

[22] Filed: Apr. 17, 1975

[21] Appl. No.: 569,008

[52] U.S. Cl. .................................. 60/641; 60/530; 60/675
[51] Int. Cl.² ....................... F01K 7/02; F01K 7/06
[58] Field of Search .............. 60/641, 675, 530, 531

[56] References Cited
UNITED STATES PATENTS

| | | | |
|---|---|---|---|
| 389,515 | 9/1888 | Iske | 60/675 |
| 3,509,716 | 5/1970 | Avery | 60/641 |

*Primary Examiner*—Allen M. Ostrager
*Attorney, Agent, or Firm*—Weingarten, Maxham & Schurgin

[57] ABSTRACT

A solar engine including a vessel disposed for motion along a predetermined path and having an array of discrete expandable and contractable chambers disposed in spaced relation along the path. The vessel contains relatively non-expandable fluid while the chambers each contain a relatively expandable and contractable fluid which is of lesser density than the non-expandable fluid. The chambers along a predetermined section of said vessel are maintained at a cooler temperature than those chambers exposed to solar energy. The chambers exposed to solar energy are caused to expand upon heating of the fluid therein, causing displacement of the non-expandable fluid. At the same time, the cooled chambers are caused to contract in response to cooling of the fluid therein and permitting the inflow of an additional quantity of non-expandable fluid into the cooled section of the vessel. As a result, the cooled section of the vessel contains a greater amount of non-expandable fluid, producing a mechanical unbalance which in turn produces movement of the vessel along the path.

10 Claims, 5 Drawing Figures

SOLAR ENGINE

FIELD OF THE INVENTION

This invention relates to solar engines and more particularly to a solar engine operative in a closed system employing two fluids of different weight and expandability to produce motion along a predetermined path.

BACKGROUND OF THE INVENTION

Solar engines are known for producing mechanical movement in response to a mechanical unbalance in a movable structure created by received solar energy. One such engine of known construction is shown in U.S. Pat. No. 3,509,716 wherein a plurality of tanks are arranged in a circumferential path, each diametric pair of tanks being interconnected by a fluid passage. The circumferential array of tanks is disposed for rotation in a vertical plane, the tanks containing a volatile liquid. The lower tank of each diametric pair is heated by passage through a sun heated pool, while the upper tank of the diametric pair is cooled by a water spray. The volatile liquid in the heated lower tank of each diametric pair is vaporized, the volatized fluid rising through the interconnecting passage to the upper tank, which upon being cooled, causes condensation of the volatized fluid back to the liquid state. The presence of liquid in the upper tank and vapor in the corresponding lower tank causes mechanical unbalance and rotation of the circumferential structure.

Another solar powered structure providing rocking motion or rotary motion is shown in U.S. Pat. No. 1,911,456 in which one or more pairs of bulbs are in fluid interconnection and contain a volatile liquid. One bulb of each pair is shaded from solar energy, while the other of the bulbs is exposed to such energy. The unshaded bulb becomes heated and forces the liquid therein via the interconnecting passage to the opposite bulb which now contains a greater quantity of liquid and therefore causes a mechanical unbalance. In the known apparatus described above, a volatile liquid must be employed as the operative fluid and the movable structure requires one or more pairs of opposed vessels containing the volatile liquid and being in fluid interconnection. The required interconnection of opposed pairs of vessels tends to complicate the design of a practical engine structure.

SUMMARY OF THE INVENTION

In accordance with the present invention, a solar engine is provided which is relatively simple in construction and operative as a closed system to yield mechanical motion in response to applied solar energy. The novel solar engine comprises a vessel disposed for motion along a predetermined path and having a plurality of discrete expandable and contractable chambers disposed in spaced relation along the path. The vessel contains a relatively non-expandable fluid, while the chambers each contain a relatively expandable and contractable fluid which is also of lesser density than the non-expandable fluid. Cooling apparatus is provided along a selected section of the path to maintain the chambers in this section at a cooler temperature than those exposed to solar energy.

In operation, the array of chambers exposed to solar energy is caused to expand in response to heating of the fluid therein by received solar energy, in turn causing displacement of a quantity of non-expandable fluid in the vessel. While the first array of chambers is being heated, the cooled chambers are caused to contract by contraction of the cooled fluid therein, thereby permitting the inflow of additional non-expandable fluid with the cooled section of the vessel. The presence of a greater amount of non-expandable fluid in the cooled section of the vessel causes an unbalance which, in turn, produces movement of the vessel along the predetermined path.

In preferred embodiment, the vessel disposed disposed for movement about a closed path and provides rotary motion in response to applied solar energy. The invention is not limited to such embodiment, however, as the vessel can be otherwise disposed for intended movement along a selected path to suit specific operational requirements.

DESCRIPTION OF THE DRAWINGS

The invention will be more fully understood from the following detailed description taken in conjunction with the accompanying drawings in which.

DETAILED DESCRIPTION OF THE INVENTION

Figure 1:
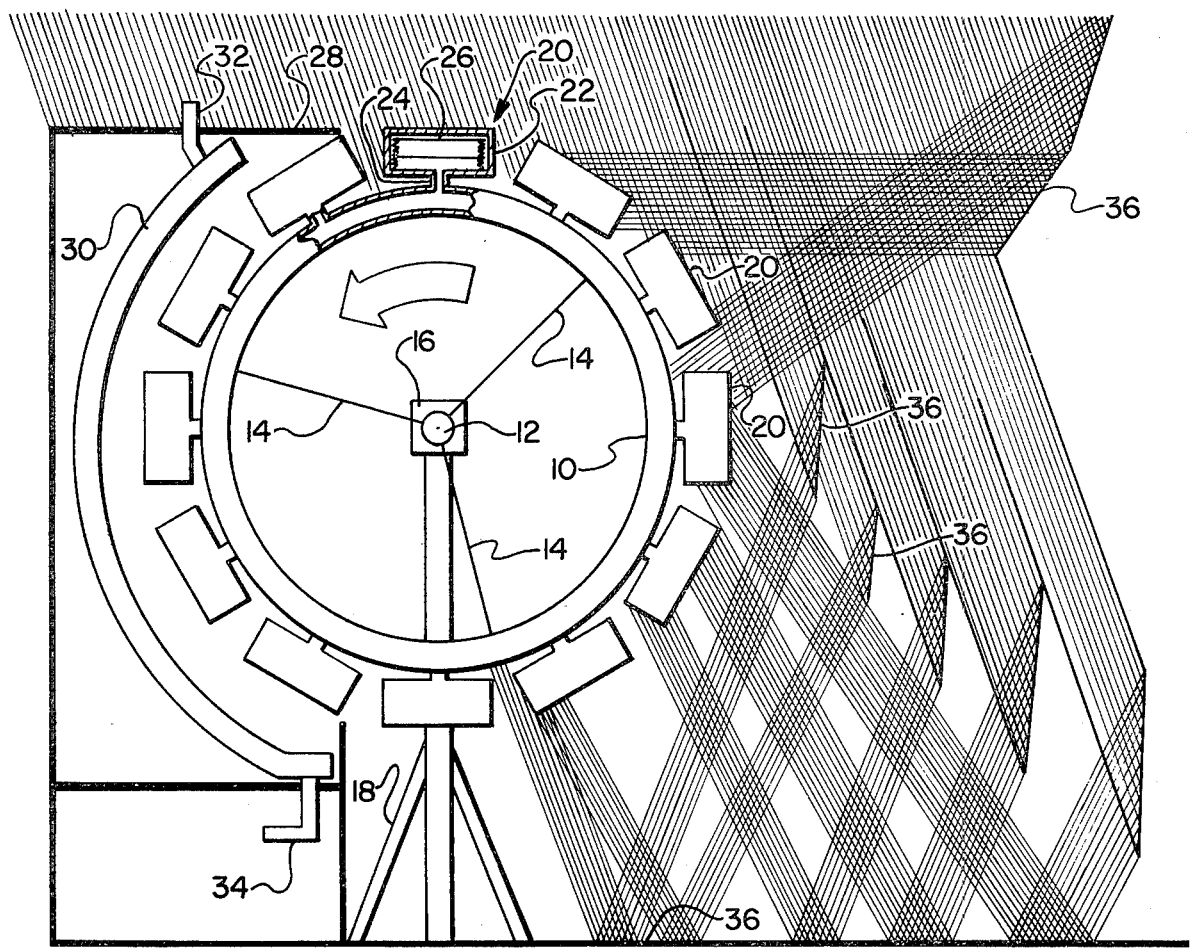
FIG. 1 is an elevational view, partly in section, of a solar engine according to the present invention.

Referring to FIG. 1, there is shown an embodiment of the invention adapted for rotary movement about an axis in response to applied solar energy. A conduit 10 of circular configuration is supported for rotation about a horizontal axis by means of an axle 12 and radial spokes 14. The axle 12 is supported by and rotatable on a bearing 16 which, in turn, is supported by a mounting structure 18. The conduit 10 is in fluid communication with a plurality of cells disposed in regular spaced relationship about the perimeter of conduit 10. Each cell 20 includes a housing 22 defining a chamber therein and an interconnecting pipe 24 providing fluid communication between the interior of conduit 10 and the chamber of housing 22.

Disposed within the interior of each cell 20 is an expandable and contractable closed container 26 providing an expandable and contractable chamber. Cooling apparatus is provided along a predetermined section of conduit 10 and includes a shield 28 which thermally insulates the cells 20 disposed along the selected section of the conduit from solar energy. In the illustrated embodiment, the cells along approximately one-half the circumference of conduit 10 are shielded from received energy. The cooling apparatus typically includes a spray bath provided by a pipe 30 containing spray nozzles directed toward the shielded cells, the pipe 30 being supplied with flowing water or other coolant by supply couplings 32 and 34. A non-expandable fluid is contained in conduit 10 and of a quantity to fill the conduit and the available volume in cells 20. An expandable fluid lighter than the non-expandable fluid is contained within respective containers 26. Typically, the expandable fluid is a gas or vapor, while the non-expandable fluid is a liquid. Typical expandable fluids are air, Freon and ammonia, while water is a typical nonexpandable fluid.

In operation, solar energy impinging on cells 20 outside of shield 28 causes heating of the fluid in containers 26 and expansion of this fluid and its containers. Expansion of containers 26 causes expulsion of the non-expandable fluid from the associated cells into conduit 10. At the same time, cells 20, isolated from solar energy by the cooling apparatus, are at a cooler temperature than the temperature of the non-cooled cells. Thus, the fluid in containers 26 of the cooled cells is caused to contract, causing corresponding contraction of containers 26 to permit the inflow of fluid from conduit 10 into the cells 20 of the cooled zone. The cells along the cooled section of conduit 10 contain a greater quantity of non-expandable fluid than the cells exposed to solar energy, thereby creating a mechanical unbalance which produces rotation of conduit 10 and the associated cells. In the illustration of FIG. 1, rotation occurs in a counterclockwise direction as indicated by the arrow. In order to more fully expose the cells 20 to solar energy, a plurality of reflective surfaces 36 can be disposed such as in FIG. 1 to direct incident energy from the sun onto intended areas of cells 20.

Figure 2:
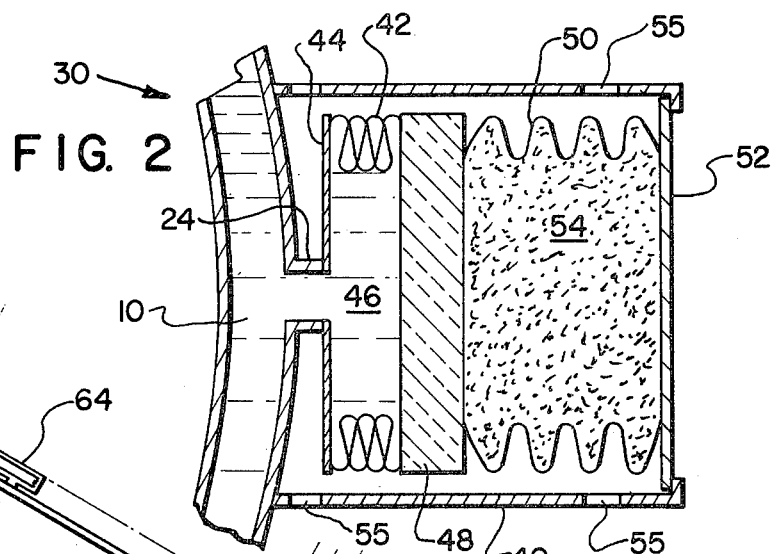
FIG. 2 is a sectional elevational view of a typical cell of the embodiment of FIG. 1.

A cell 20 is shown more particularly in FIG. 2 in a typical construction. An enclosure 40 is affixed to the peripheral surface of conduit 10. A first bellow housing 42 includes a plate 44 affixed to pipe 24 and providing a fluid communication path from conduit 10 into chamber 46 of housing 42. The bellow housing 42 is affixed to a plate 48 of thermally insulative material which is also affixed to a second bellows housing 50, this latter housing being attached to outer wall 52 of enclosure 40 to define a chamber 54. Plate 48 serves to minimize heat loss from chamber 54 into chamber 46. A plurality of openings 55 are provided through one or more walls of enclosure 40 to permit the interior of the enclosure to remain at ambient pressure and not impede the expansion and contraction of housings 42 and 50. Chamber 54 is filled with an expandable fluid, while chamber 46 contains non-expandable fluid supplied from conduit 10. In FIG. 2, chamber 54 is shown in its expanded condition in response to an elevated temperature caused by received solar energy. Chamber 46 is illustrated in its contracted condition caused by the corresponding expansion of chamber 54. When the enclosure 40 is disposed within the cooled zone within shield 8 (FIG. 1), the lower temperature provided within this zone causes contraction of the fluid in chamber 54 and consequent contraction of this chamber and expansion of chamber 46 to permit inflow of non-expandable fluid into chamber 46 from conduit 10. The enclosure 40, or at least wall 52 thereof, is of a material transmissive to solar radiation to transmit received solar energy into chamber 54. The material can be thermally and radiationally transmissive and may also be optically transmissive.

Figure 3:
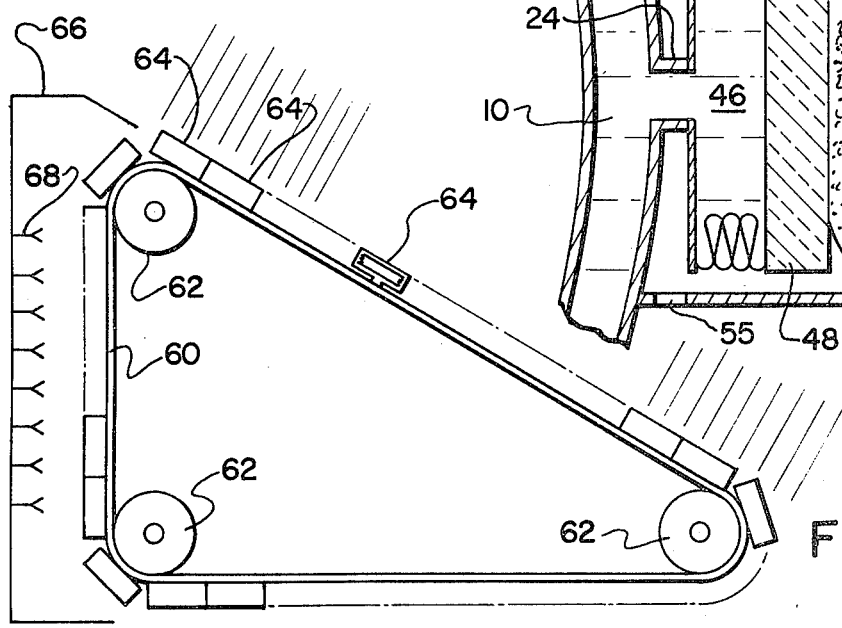
FIG. 3 is an elevational view of an alternative embodiment of a solar engine according to the invention.

It will be appreciated that the invention can be embodied in other than a circular configuration. As an example of an alternative embodiment, there is shown in FIG. 3 a solar engine disposed for movement about a generally triangular path to provide rotational output movement. A conduit 60 is disposed for movement about the triangular path by rollers 62. A plurality of cells 64 are coupled to conduit 60 as in the embodiment described above. Cooling apparatus, including a shield 66, is provided around the cells associated with the vertical leg of the triangular structure and can include spray nozzles 68 or other appropriate cooling means to provide a lower temperature than that to which the non-shielded cells are exposed. The conduit 60 in this embodiment is flexible to permit its movement around rollers 62, and may be part of a chain or belt operative in association with rollers 62. The rollers provide guidance of conduit 60 and associated cells 64 about their path and one or more of the rollers can provide a power takeoff for the output motion of the engine.

Figure 4:
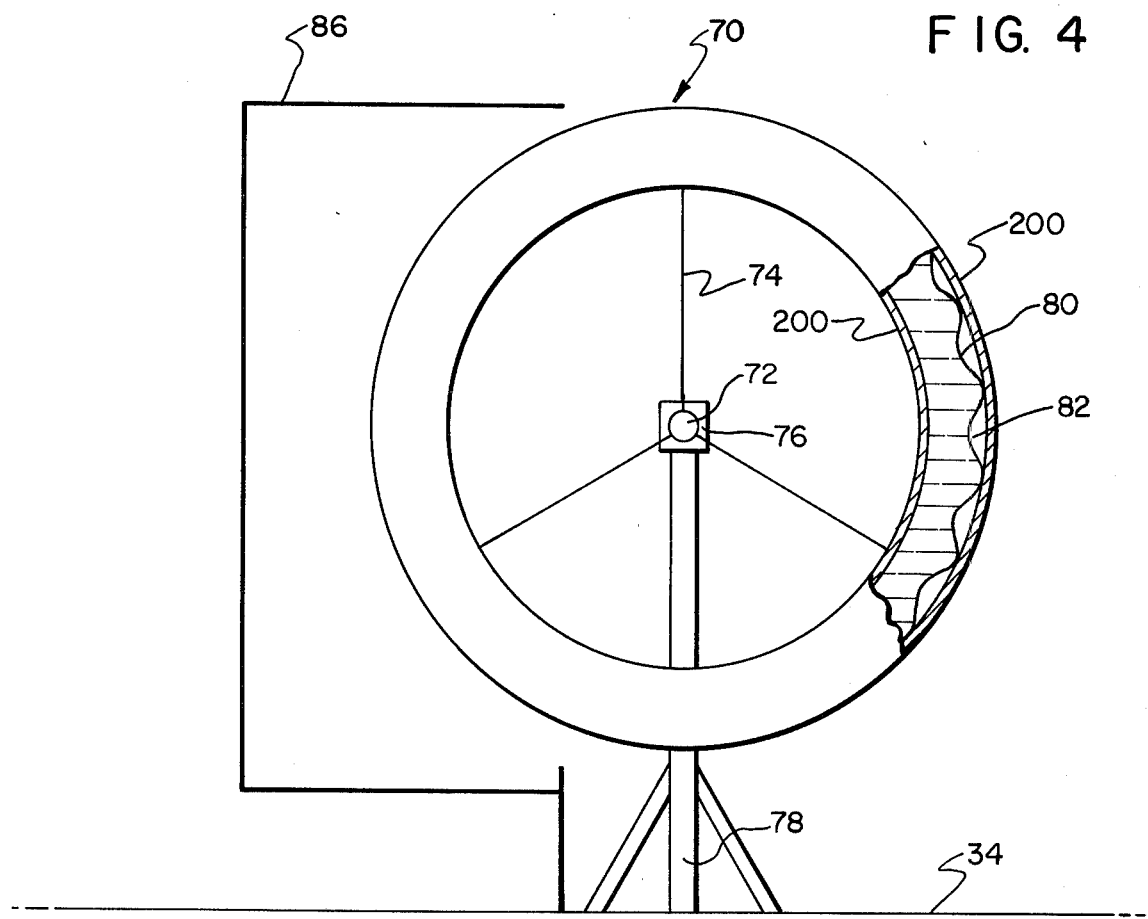
FIG. 4 is an elevational view, partly in section, of a further embodiment of the invention.
Figure 5:
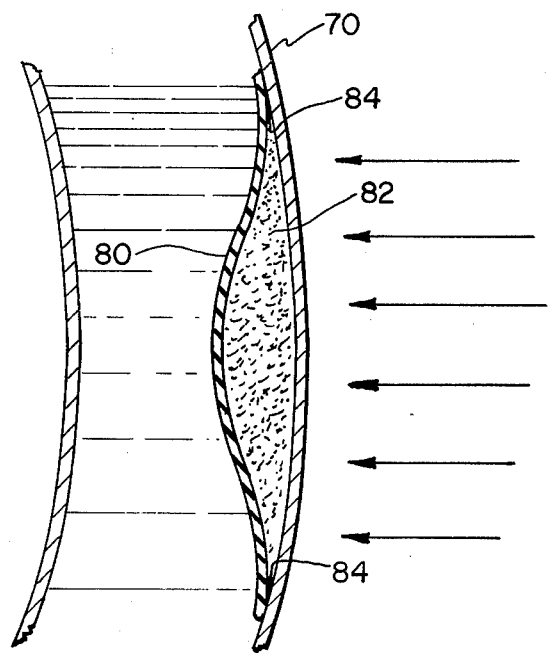
FIG. 5 is a cutaway sectional view of the chamber construction of the embodiment of FIG. 4.

A further embodiment is shown for FIGS. 4 and 5 wherein the expandable and contractable chambers are disposed within the conduit structure itself. Referring to FIG. 4, a circular conduit 70 is shown supported on an axle 72 by radial spokes 74. The axle 72 is supported for rotation on a bearing 76 affixed to a suitable mounting 78. A web 80 of elastic material is disposed in scalloped configuration within conduit 70 and is bonded or otherwise affixed to the inner surface of the conduit at spaced points 84, as shown most clearly in FIG. 5, to define a plurality of closed pockets or chambers 82 containing expandable fluid. Cooling apparatus 86 is disposed about a section of conduit 70, as in the above-described embodiments, to lower the temperature of this section relative to the temperature at the non-cooled portion of the conduit exposed to solar energy. The outer peripheral wall of conduit 70 is transmissive to solar radiation for conveyance of solar energy into chambers 82. The surface of web 80 confronting chambers 82 or the web itself can be of a thermally insulating material to reduce heat loss from the chambers.

In operation, solar energy received by the non-cooled section of conduit 70 causes heating of the fluid in chambers 82 to thereby cause expansion of this fluid and the expandable wall of the chamber provided by web 80. The expansion of chambers 82 cause displacement of fluid in the adjacent portions of conduit 70, this displacement producing flow of non-expandable fluid in the conduit to the cooled section thereof in which the chambers 82 are contracted by reason of the cooler temperature of the fluid within these cooled chambers. The cooled section of conduit 70 is thus heavier than the exposed section by reason of the presence of a greater quantity of non-expandable fluid thereby resulting in unbalance of the rotary structure and rotation thereof about axle 72.

From the foregoing, it should be evident that the invention is of simple construction which can be readily implemented from a variety of well-known materials to provide an intended solar engine structure. It will be appreciated that the vessel containing the non-expandable fluid can be of any desired configuration, and that the construction of the expandable chambers can be variously implemented. Accordingly, it is not intended to limit the invention by what has been particularly shown and described except as indicated in the appended claims.

What is claimed is:
1. A solar engine comprising:
    a vessel disposed for movement along a predetermined path and containing a first relatively non-expandable fluid;
    a plurality of expandable and contractable chambers each disposed at a successive spaced interval along said vessel, and each containing a second relatively expandable and contractable fluid;
    means for supporting said vessel for motion along said path;

means for cooling the chambers disposed along a predetermined section of said vessel to maintain the chambers in this section at a lower temperature than the temperature of those chambers exposed to solar energy;

the chambers exposed to solar energy being expandable in response to heating of said second fluid contained therein, the expansion of said chambers causing displacement of said first fluid in the section of said vessel exposed to solar energy and conveyance of said first fluid into the cooled section of said vessel;

said cooled section being heavier than the section exposed to solar energy thereby causing movement of said vessel along said path.

2. A solar engine according to claim 1 wherein said chambers are provided by a web of elastic material disposed in said vessel and affixed to a surface thereof at spaced intervals to define said chambers.

3. A solar engine according to claim 2 wherein said web includes a surface confronting said chambers having a thermally absorptive coating thereon.

4. A solar engine comprising:

an elongated conduit disposed along a predetermined path;

a plurality of cells disposed in spaced relation along said conduit and in fluid communication therewith;

said conduit and said cells containing a first relatively non-expandable fluid;

a plurality of expandable and contractable chambers each disposed within a respective one of said cells and each containing a second relatively expandable fluid therein operative upon heating by received solar energy to expand and cause expansion of said chamber and expulsion of a quantity of said first fluid from said cell to said conduit;

means for supporting said conduit and plurality of cells for motion along said path;

means for cooling the cells disposed along a predetermined section of said conduit to maintain the cells in this section at a lower temperature than the temperature of those cells exposed to solar energy and thereby cause contraction of said second fluid and chambers in this section and permit inflow of a quantity of said first fluid from said conduit into said cooled cells;

said cooled cells being heavier than those cells exposed to solar energy and causing movement of said conduit and associated cells along said path.

5. A solar engine according to claim 4 wherein each of said plurality of cells comprises:

a first expandable and contractable housing in fluid communication with said conduit and containing said non-expandable fluid;

a second closed expandable and contractable housing defining said chamber and in mechanical engagement with said first housing;

said first housing being expandable upon heating of the expandable fluid therein to cause contraction of said first housing and displacement of said non-expandable fluid from said first housing to said conduit.

6. A solar engine according to claim 5 wherein each of said first and second housings includes a bellows construction providing intended expansion and contraction, said housing being disposed for expansion and contraction along a common axis and having thermally insulative means disposed between the confronting portions of said first and second housing.

7. A solar engine according to claim 4 wherein said elongated conduit and plurality of cells are disposed around a circular path, and wherein said supporting means includes a support structure for maintaining said plurality of cells for rotation in a generally vertical plane.

8. A solar engine according to claim 4 wherein said conduit is of flexible construction disposed around a predetermined closed path;

and wherein said supporting means includes a plurality of rollers around which said flexible conduit is disposed for movement along the predetermined path.

9. A solar engine according to claim 4 further including one or more reflecting surfaces disposed with respect to said non-cooled cells to reflect solar energy thereon.

10. A solar engine according to claim 4 wherein the surface of each of said cells exposed to solar energy includes a thermally absorptive coating.

* * * * *